(12) United States Patent
Spafford

(10) Patent No.: US 9,161,548 B1
(45) Date of Patent: Oct. 20, 2015

(54) ANIMAL UNDERBELLY BONE SPLITTER

(71) Applicant: Ronald A. Spafford, Janesville, WI (US)

(72) Inventor: Ronald A. Spafford, Janesville, WI (US)

( * ) Notice: Subject to any disclaimer, the term of this patent is extended or adjusted under 35 U.S.C. 154(b) by 0 days.

(21) Appl. No.: 14/608,222

(22) Filed: Jan. 29, 2015

Related U.S. Application Data

(63) Continuation of application No. 14/457,150, filed on Aug. 12, 2014, now abandoned.

(60) Provisional application No. 61/950,041, filed on Mar. 8, 2014.

(51) Int. Cl.
  *A22B 3/10* (2006.01)
  *A22C 17/06* (2006.01)
  *A22B 5/20* (2006.01)
  *A22B 5/00* (2006.01)

(52) U.S. Cl.
  CPC ... *A22B 5/20* (2013.01); *A22B 3/10* (2013.01); *A22B 5/0047* (2013.01); *A22C 17/06* (2013.01)

(58) Field of Classification Search
  CPC ...... A22B 3/10; A22B 5/0017; A22B 5/0047; A22C 17/004; A22C 17/06
  USPC .................................. 452/101–105, 132, 137
  See application file for complete search history.

(56) References Cited

U.S. PATENT DOCUMENTS

| | | | |
|---|---|---|---|
| 421,197 A * | 2/1890 | Scholfield | 30/432 |
| 954,084 A * | 4/1910 | Gelbman | 452/137 |
| 1,843,223 A * | 2/1932 | Hasseler | 30/353 |
| 1,988,386 A * | 1/1935 | Komperud | 30/353 |
| 2,030,463 A * | 2/1936 | Nelms | 452/137 |
| 2,793,392 A * | 5/1957 | Cutrera | 452/137 |
| 3,333,295 A * | 8/1967 | Spets | 452/129 |
| 3,893,238 A * | 7/1975 | Scholl | 30/294 |
| 4,172,306 A * | 10/1979 | Hopkins | 452/6 |
| 5,613,904 A * | 3/1997 | LaSalle et al. | 452/6 |
| 5,690,548 A | 11/1997 | Jones et al. | |
| D442,342 S | 5/2001 | Parrish | |
| 6,280,312 B1 | 8/2001 | Elrod et al. | |
| 6,578,271 B1 * | 6/2003 | Macek | 30/279.2 |
| 6,607,430 B1 * | 8/2003 | Navarette | 452/105 |
| 8,235,775 B1 | 8/2012 | Moy | |
| 2003/0208910 A1 * | 11/2003 | Dudley et al. | 30/314 |

* cited by examiner

*Primary Examiner* — David Parsley
(74) *Attorney, Agent, or Firm* — Donald J. Ersler

(57) ABSTRACT

An animal underbelly bone splitter preferably includes a base member, a bottom leg, a top leg and a handle portion. The bottom leg extends from one end of the base member at a bottom thereof. The top leg extends from the one end of the base member at a top thereof, such that a bone slot is created between the bottom leg and the top leg. A curved connecting surface preferably connects the bottom leg with the top leg. A cutting edge is formed on a top edge of the bottom leg. The handle portion extends from an opposing end of the base member at an acute angle from the top edge of the top leg. A resilient grip is formed on the handle portion. A second embodiment of the animal underbelly bone splitter includes a bone pocket tab, which extends downward from an end of the top leg.

2 Claims, 2 Drawing Sheets

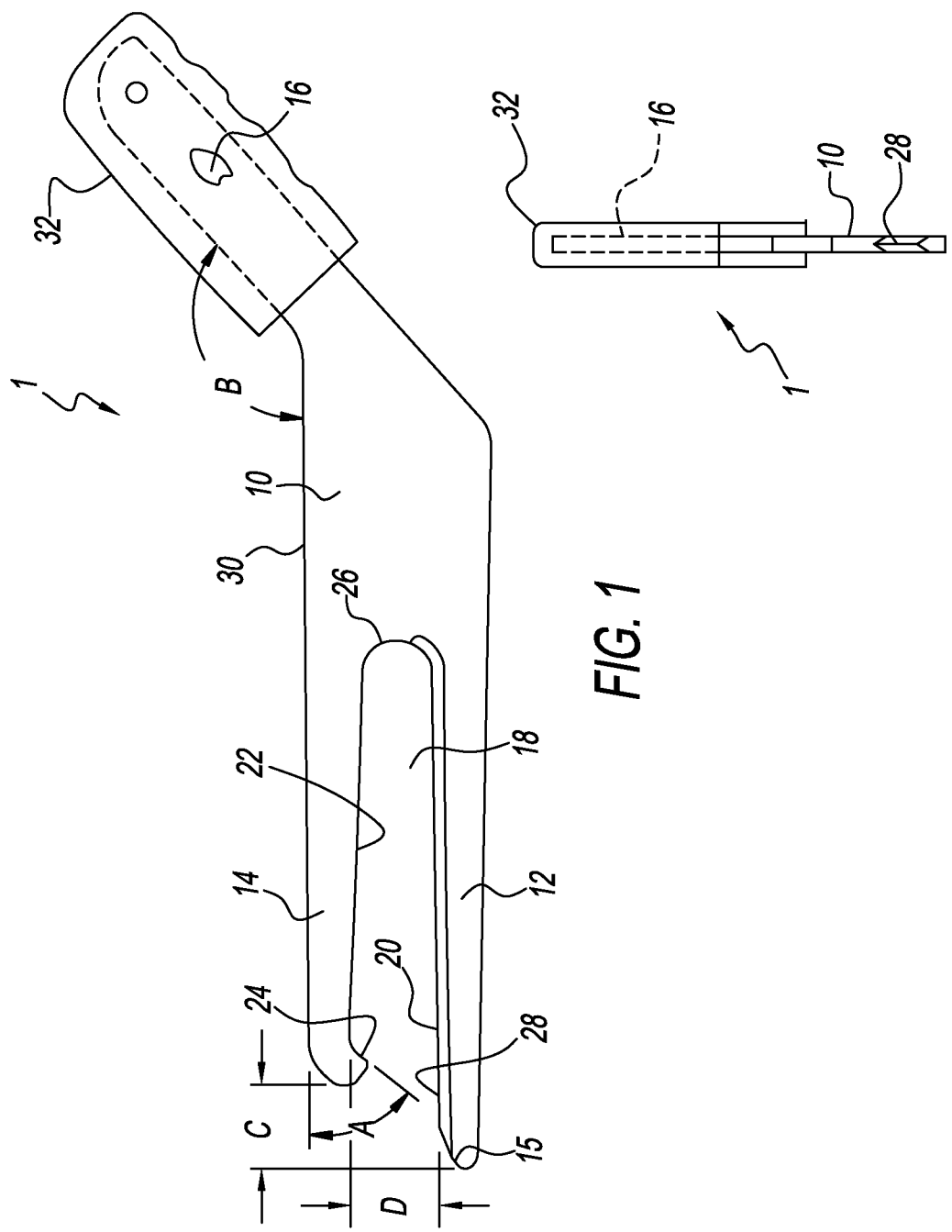

ANIMAL UNDERBELLY BONE SPLITTER

CROSS-REFERENCES TO RELATED APPLICATIONS

This is a continuation-in-part patent claiming the benefit of application Ser. No. 14/457,150, filed on Aug. 12, 2014, which takes priority from provisional application No. 61/950,041, filed on Mar. 8, 2014.

BACKGROUND OF THE INVENTION

1. Field of the Invention

The present invention relates generally to dressing an animal and more specifically to an animal underbelly bone splitter, which allows underbelly bones to be easily split for animal dressing.

2. Discussion of the Prior Art

U.S. Pat. No. 5,690,548 to Jones et al. discloses a pelvic griddle splitter tool and method. Pat. No. D442342 to Parrish discloses an animal dressing tool. U.S. Pat. No. 6,280,312 to Elrod et al. discloses a pelvic bone splitter, particularly for deer. U.S. Pat. No. 8,235,775 to Moy discloses a bone splitting and breaking tool.

Accordingly, there is a clearly felt need in the art for an animal underbelly bone splitter, which allows the pelvic bone and the brisket bone of an animal to be split in one upward motion.

SUMMARY OF THE INVENTION

The present invention provides an animal underbelly bone splitter, which allows underbelly bones to be easily split for animal dressing. The animal underbelly bone splitter preferably includes a base member, a bottom leg, a top leg and a handle portion. The bottom leg extends from one end of the base member at a bottom thereof. The top leg extends from the one end of the base member at a top thereof, such that a bone slot is created between a top edge of the bottom leg and a bottom edge of the top leg. An end of the top leg is terminated with an inward extending projection. A curved connecting surface preferably connects the top edge of the bottom leg and the bottom edge of the top leg. A cutting edge is formed on a top edge of the bottom leg and a portion of the curved connecting surface. The handle portion extends from an opposing end of the base member at an acute angle from the top edge of the top leg. A resilient grip is formed on the handle portion to provide better grip to a user.

A second embodiment of the animal underbelly bone splitter preferably includes a base member, a bottom leg, a top leg, a handle portion and a bone pocket tab. The bottom leg extends from one end of the base member at a bottom thereof. The top leg extends from the one end of the base member at a top thereof, such that a bone slot is created between a top edge of the bottom leg and a bottom edge of the top leg. An end of the top leg is terminated with the bone pocket tab. A shallow substantially V-shaped surface is formed in a bottom of the bone pocket tab for receiving a bone. A curved connecting surface preferably connects the top edge of the bottom leg and the bottom edge of the top leg. A cutting edge is formed on a top edge of the bottom leg. The handle portion extends from an opposing end of the base member at an obtuse angle from the top edge of the top leg. A resilient grip is formed on the handle portion to provide better grip to a user.

In use, underbelly skin of the animal is cut parallel to a length of the animal; substantially in a middle thereof; and in the area of the pelvic and brisket bones. Next, the bottom leg is inserted under the pelvic bone or the brisket bone of the animal. The animal underbelly bone splitter is pushed, such that the pelvic or brisket bone is inserted into the bone slot. The handle portion is pulled upward, until the bone cracks. The process is repeated, until the entire bone is cracked.

Accordingly, it is an object of the present invention to provide an animal underbelly bone splitter, which allows the pelvic bone and brisket bone of an animal to be split in one upward motion.

These and additional objects, advantages, features and benefits of the present invention will become apparent from the following specification.

BRIEF DESCRIPTION OF THE DRAWINGS

FIG. 1 is a side view of an animal underbelly bone splitter in accordance with the present invention.

FIG. 2 is an end view of an animal underbelly bone splitter in accordance with the present invention.

DETAILED DESCRIPTION OF THE PREFERRED EMBODIMENTS

Figure 4:
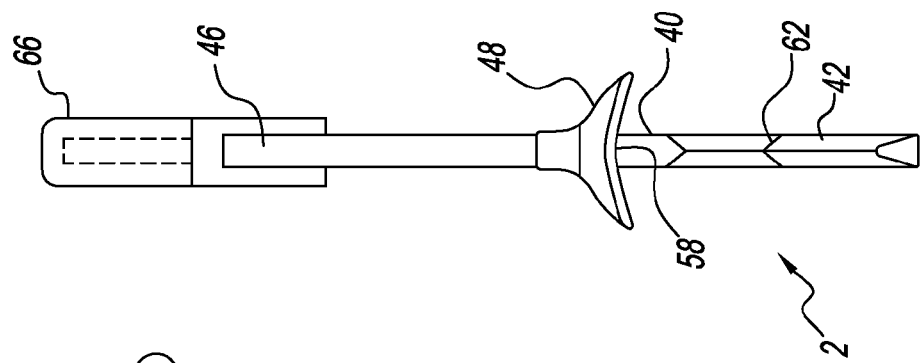
FIG. 4 is an end view of a second embodiment of an animal underbelly bone splitter in accordance with the present invention.

With reference now to the drawings, and particularly to FIG. 1, there is shown a side view of animal underbelly bone splitter 1. With reference to FIG. 2, the animal underbelly bone splitter 1 preferably includes a base member 10, a bottom leg 12, a top leg 14 and a handle portion 16. The bottom leg 12 extends from one end of the base member 10 at a bottom thereof. The top leg 14 extends from the one end of the base member 10 at a top thereof, such that a bone slot 18 is created between a top edge 20 of the bottom leg 12 and a bottom edge 22 of the top leg 14. The bottom leg 12 preferably has a length, which is greater than a length of the top leg 14. The greater length "C" is at least as long as a width "D" of the bone slot 18. An inside end of the bottom leg 12 is preferably terminated with a curved lead-in 15. The base member 10, the bottom leg 12, the top leg 14 and the handle portion 16 are preferably fabricated from a single piece stainless steel, but other materials may also be used.

An end of the top leg 14 is terminated with an inward extending projection 24. The inward extending projection 24 preferably extends from the bottom edge 22 at an acute angle "A." The acute angle "A" preferably has a value of between 30-60 degrees. A curved connecting surface 26 preferably connects the top edge 20 and the bottom edge 22. A cutting edge 28 is formed on the top edge 20 and a portion of the curved surface 26. The cutting edge 28 is preferably a double bevel cutting edge, but a single bevel cutting edge may also be used. The handle portion 16 extends upward from an opposing end of the base member 10 at an obtuse angle "B" from a top edge 30 of the top leg 14. The obtuse angle "B" preferably has a value of between 120-150 degrees. A resilient grip 32 is formed on the handle portion 16 to provide improved grip to a user. The resilient grip 32 is preferably a medium hardness rubber, but other substances may also be used.

Figure 3:
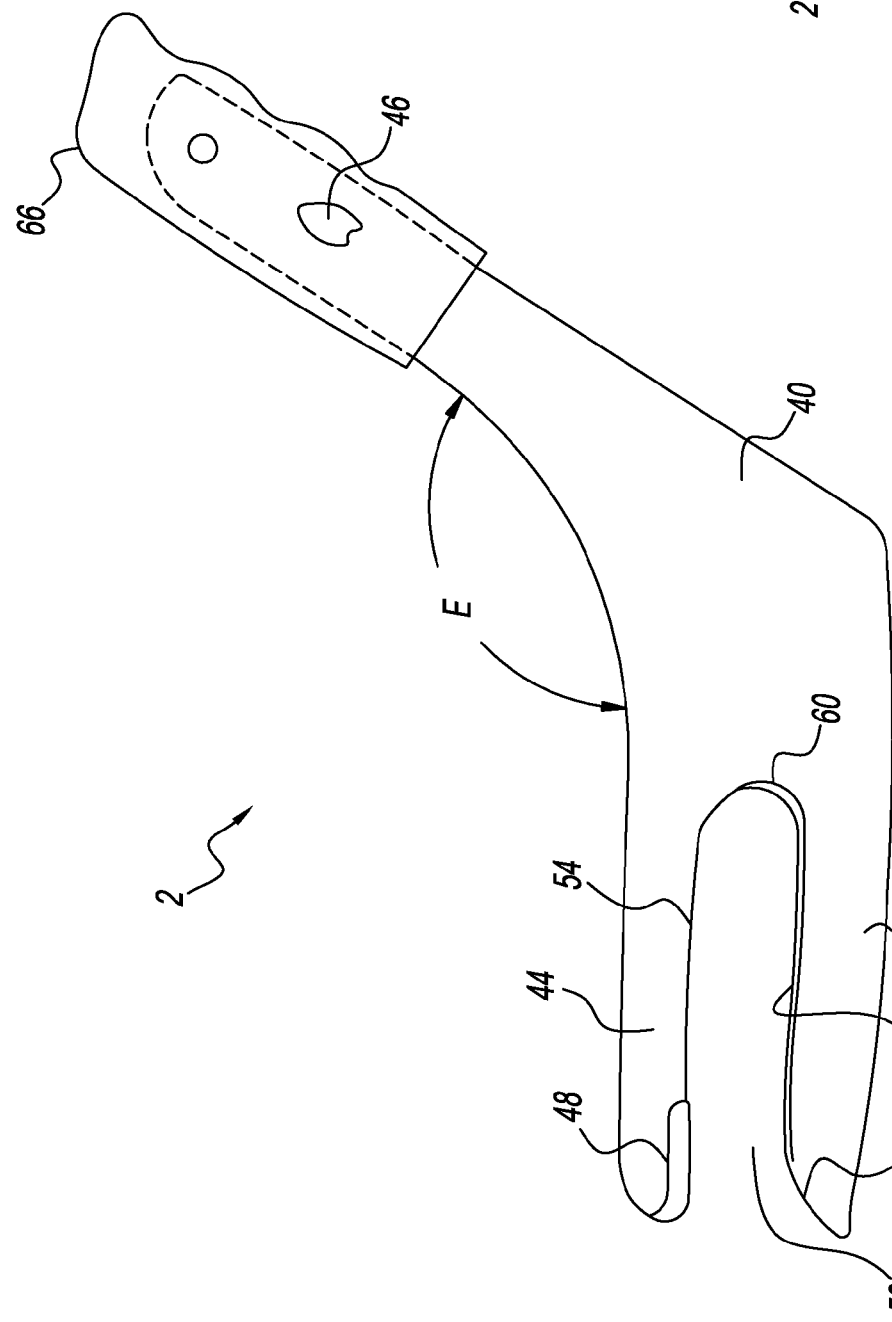
FIG. 3 is a side view of a second embodiment of an animal underbelly bone splitter in accordance with the present invention.

With reference to FIGS. 3-4, an animal underbelly bone splitter 2 preferably includes a base member 40, a bottom leg 42, a top leg 44, a handle portion 46 and a bone pocket tab 48. The bottom leg 42 extends from one end of the base member 40 at a bottom thereof. The top leg 44 extends from the one end of the base member 40 at a top thereof, such that a bone slot 50 is created between a top edge 52 of the bottom leg 42 and a bottom edge 54 of the top leg 44. The bottom leg 42 has a greater length than the top leg 44. An inside end of the bottom leg 42 is preferably terminated with a curved lead-in 56. The base member 40, the bottom leg 42, the top leg 44 and the handle portion 46 are preferably fabricated from a single piece stainless steel, but other materials may also be used.

An end of the top leg 44 is terminated with the bone pocket tab 48. A shallow substantially V-shaped surface 58 is formed in a bottom of the bone pocket tab 48 for receiving an animal bone. A centerline of the substantially shallow V-shaped surface 58 is parallel with a length of the animal underbelly bone splitter 2. A curved connecting surface 60 preferably connects the top edge 52 and the bottom edge 54. A cutting edge 62 is preferably formed on the top edge 54 and the curved lead-in 56. The cutting edge 62 is preferably a double bevel cutting edge, but a single bevel cutting edge may also be used. The cutting edge 62 may be enhanced with a plurality of serrations. The handle portion 46 extends upward from an opposing end of the base member 40 at an obtuse angle "E" from a top edge 64 of the top leg 44. The obtuse angle "E" preferably has a value of between 135-165 degrees. A resilient grip 66 is formed on the handle portion 46 to provide improved grip to a user. The resilient grip 66 is preferably a medium hardness rubber, but other substances may also be used.

In use, underbelly skin of the animal is cut parallel to a length of the animal; substantially in a middle thereof; and in the area of the pelvic and brisket bones. Next, the bottom leg 12, 42 is inserted under the pelvic bone or the brisket bone of the animal. The animal underbelly bone splitter 1, 2 is pushed with the handle portion 16, 46, such that the pelvic or brisket bone is inserted into the bone slot 18, 50. The handle portion 16, 46 is pulled upward, until the pelvic or brisket bone cracks. The process is repeated, until the entire pelvic or brisket bone cracks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An animal underbelly bone splitter comprising,
a base member having opposing first and second ends,
an elongated bottom leg extending laterally from the first end of the base member at substantially a bottom thereof,
an elongated top leg extending laterally from the first end of the base member at substantially a top thereof, the bottom leg has a longitudinal length greater than a longitudinal length of the top leg, the bottom and top legs each having a free distal end forming a tip in opposed relation to the base member, the tip of the bottom leg having a curved upper surface meeting with a bottom edge of the bottom leg to form a tip point, the tip of the top leg being substantially curved, a curved connecting surface connects the top edge of the bottom leg to the bottom edge of the top leg,
a bone slot formed between a top cutting edge of the bottom leg and a bottom edge of the top leg, the bone slot being closed and curved at an interior end and being wider at an opposed open exterior end, the exterior end of the bone slot having a substantially straight upper portion and a curved lower portion, a vertical height of the bone slot being greater than a vertical height of the top leg,
a handle portion extending at an obtuse angle away from and rearward from the top leg and the second end of the base member,
a bone pocket tab extends downward from the free end and bottom edge of the top leg and extending inward a distance substantially less than the longitudinal length of the top leg from the free end of the top leg on the bottom edge of the top leg, the bone pocket tab having an inverted V-shaped surface formed in a bottom of the bone pocket tab, a height of the bone pocket tab being less than a lateral width of the bone pocket tab, and a longitudinal length of the bone pocket tab being greater than the height of the bone pocket tab,
wherein the bone pocket tab is adapted to receive an animal bone.

2. The animal underbelly bone splitter of claim 1, wherein the handle portion extends from the base member at an angle of 135-165 degrees relative to a top of the base member.

* * * * *